(12) United States Patent
Saito

(10) Patent No.: US 11,036,448 B2
(45) Date of Patent: Jun. 15, 2021

(54) PRINTING APPARATUS AND METHOD OF CONTROLLING THE SAME, AND STORAGE MEDIUM

(71) Applicant: CANON KABUSHIKI KAISHA, Tokyo (JP)

(72) Inventor: Sho Saito, Toda (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/808,456

(22) Filed: Mar. 4, 2020

(65) Prior Publication Data

US 2020/0293249 A1 Sep. 17, 2020

(30) Foreign Application Priority Data

Mar. 11, 2019 (JP) .............................. JP2019-044192

(51) Int. Cl.
*G06F 15/00* (2006.01)
*G06F 3/12* (2006.01)
*G06K 1/00* (2006.01)

(52) U.S. Cl.
CPC .......... *G06F 3/1243* (2013.01); *G06F 3/1205* (2013.01); *G06F 3/1232* (2013.01); *G06F 3/1254* (2013.01); *G06F 3/1288* (2013.01)

(58) Field of Classification Search
CPC .... G06F 3/1243; G06F 3/1205; G06F 3/1232; G06F 3/1254; G06F 3/1288
USPC ................ 358/1.13, 1.15, 1.14, 1.1
See application file for complete search history.

(56) References Cited

U.S. PATENT DOCUMENTS

| 2013/0135630 | A1 | 5/2013 | Miyajima |
| 2014/0064772 | A1 | 3/2014 | Azami |
| 2014/0340710 | A1* | 11/2014 | Yin ...................... G06F 3/1234 358/1.15 |
| 2017/0346973 | A1* | 11/2017 | Kusakabe .......... H04N 1/00408 |
| 2019/0034129 | A1 | 1/2019 | Iwata |
| 2019/0384540 | A1* | 12/2019 | Noguchi ............... G06F 3/1205 |

FOREIGN PATENT DOCUMENTS

JP H10-143342 A 5/1998

OTHER PUBLICATIONS

T. Hastings et al., Internet Printing Protocol/1.1: Model and Semantics, Network Working Group, Standard Tracks, pp. 1-224 (Sep. 2000).
The Printer Working Group, IPP Finishings 2.0 (FIN), Candidate Standard PWG 5100.1-2014, pp. 1-59 (Dec. 19, 2014.).
European Search Report dated Jul. 27, 2020, in related European Patent Application No. 20160187.9.

* cited by examiner

*Primary Examiner* — Douglas Q Tran
(74) *Attorney, Agent, or Firm* — Venable LLP

(57) ABSTRACT

A printing apparatus receives a print job from an information processing apparatus and performs printing. The printing apparatus obtains, from the information processing apparatus, information indicating the number of pages per copy of the print job, determines whether double-sided printing is to be performed for the print job, and determines, based on the obtained information, whether the print job is a print job in which the number of pages per copy is an odd number of pages. The printing apparatus controls to print by inserting a blank page before a page that is received first in the print job, based on a determination that, in the print job, the number of pages per copy is an odd number of pages.

17 Claims, 9 Drawing Sheets

F I G. 3
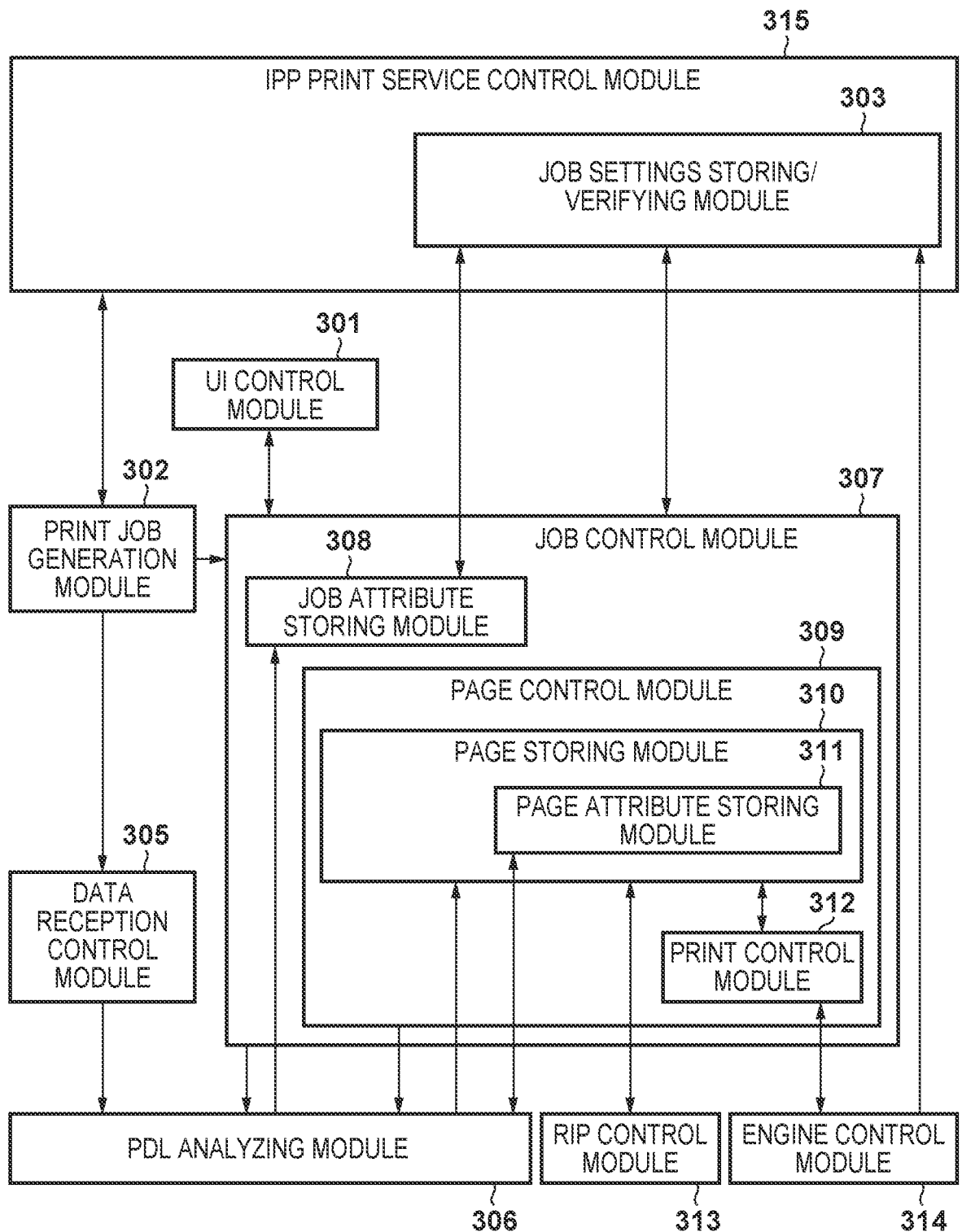

FIG. 5
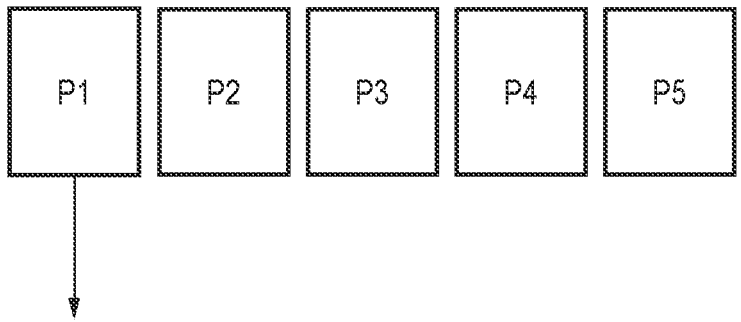
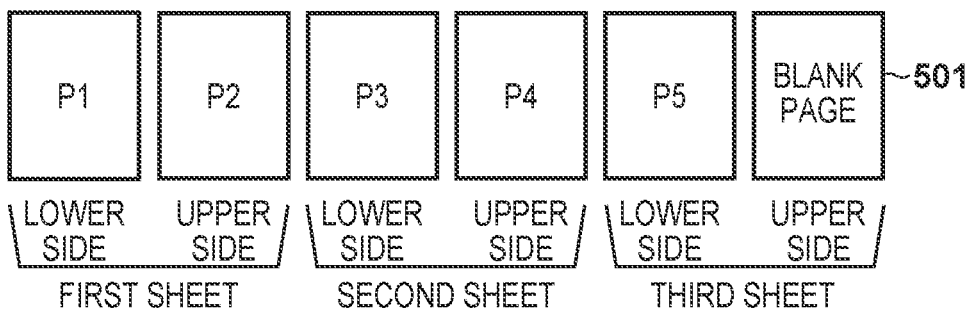
FIG. 6
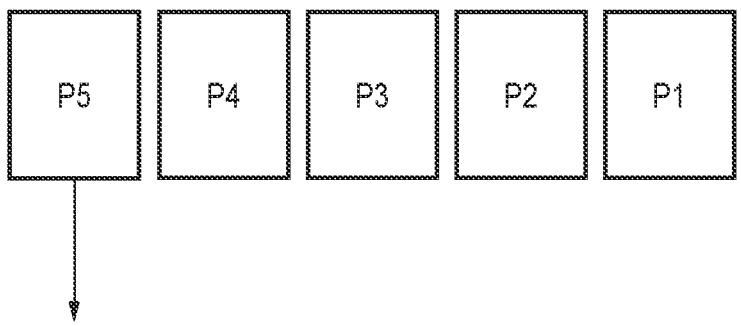
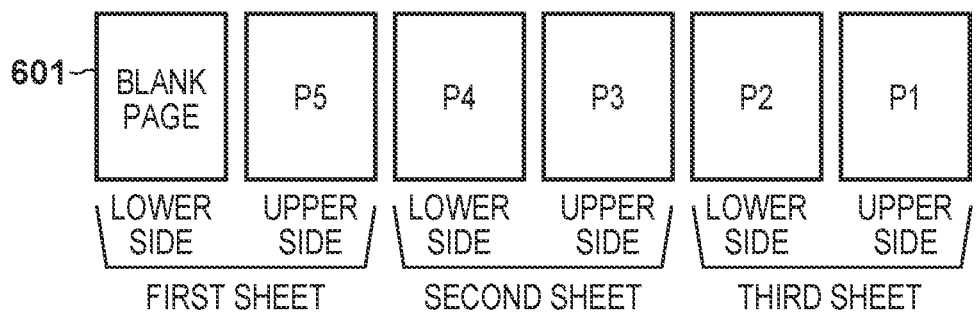

FIG. 7
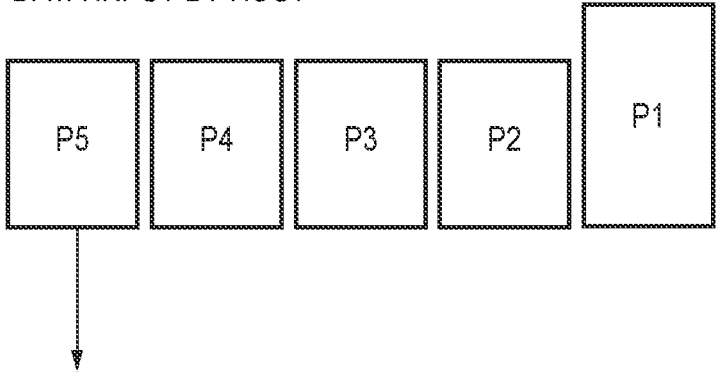
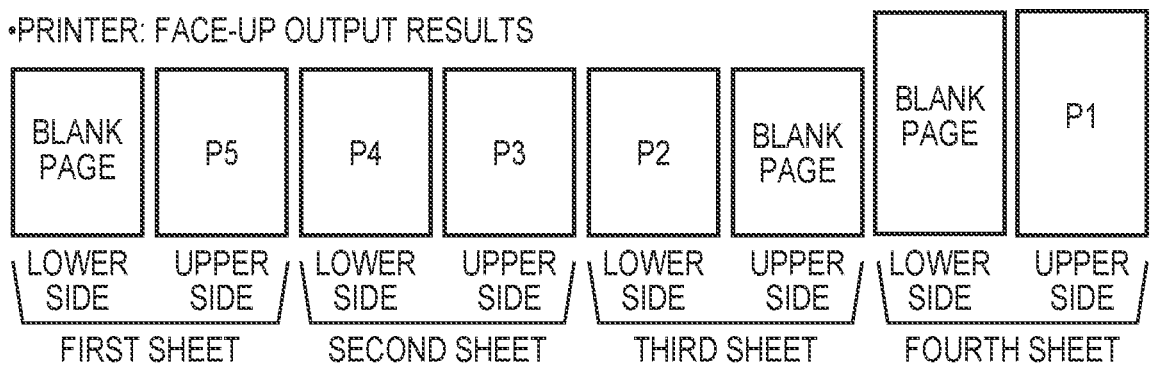
FIG. 8
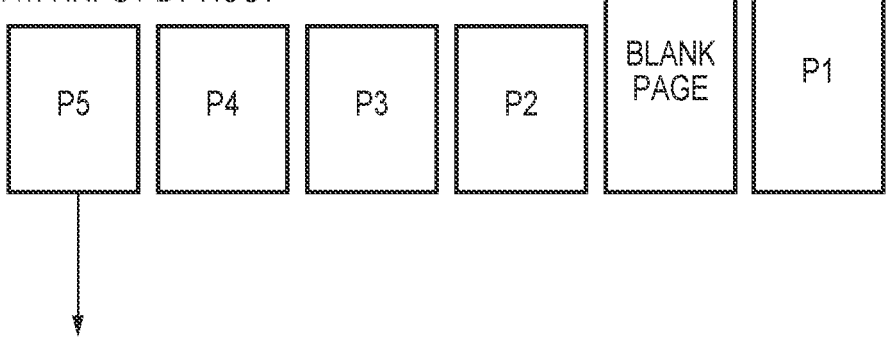
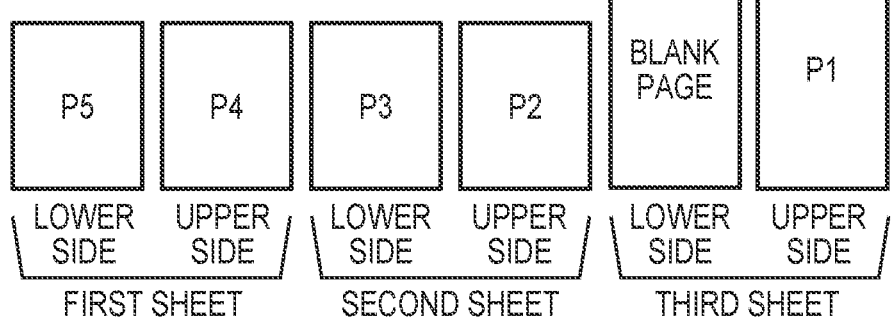

FIG. 9

```
"Create-Job";

OperationAttributes = (
    {
      "attributes-charset" = "utf-8";
      "attributes-natural-language" = ja-jp;
      "printer-uri" = "ipp://xxx.local:631/ipp/print";
      "requesting-user-name" = "suzuki"
    }
  );

JobAttributes = (
    "copies" = 3;                               ~901
    "print-color-mode" = "monochrome";
    "sides" = "two-sided-long-edge";            ~902
    "media" = "letter";                         ~903
    "page-order-received" = "n-to-1-order";     ~904
    "job-pages-per-set" = 7;                    ~905
    "finishing" = "staple-dual-right";
    "overrides = (
      {
        "pages" = 1:1;      }
        "media" = "legal";  } 906
      }
    );
  );
```

FIG. 11
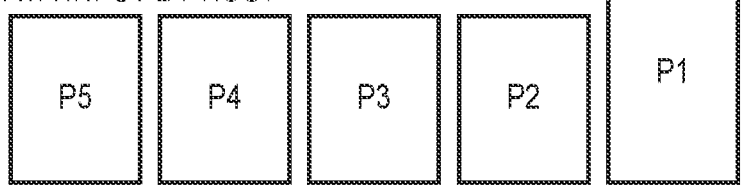
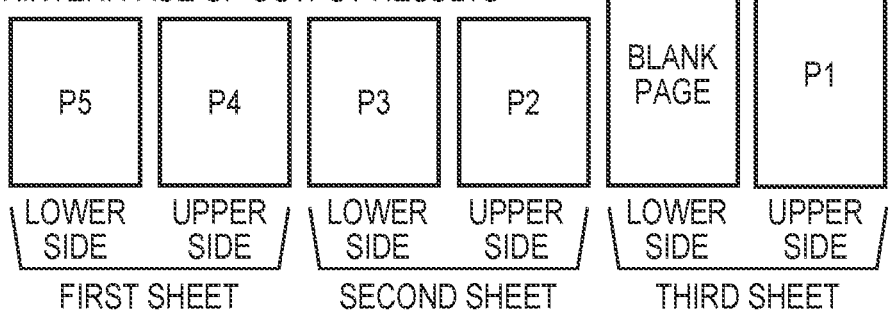
FIG. 12
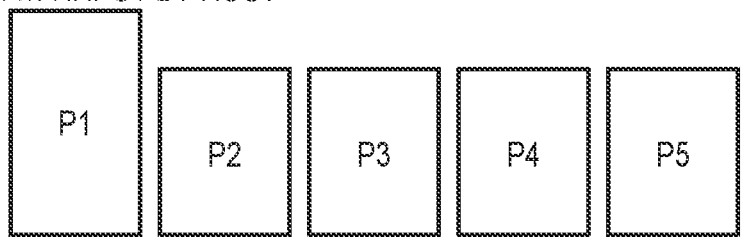
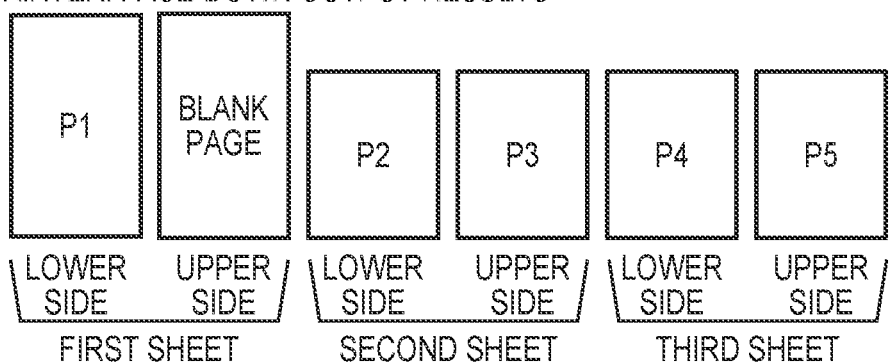

PRINTING APPARATUS AND METHOD OF CONTROLLING THE SAME, AND STORAGE MEDIUM

BACKGROUND OF THE INVENTION

Field of the Invention

The present invention relates to a printing apparatus and a method of controlling the printing apparatus, and a storage medium.

Description of the Related Art

In printing conforming to the Internet Printing Protocol (IPP; RFC2911 (https://tools.ietf.org/html/rfc2911)), it is known that, if a print job in the Printer Working Group (PWG) Raster format is transmitted to a printing apparatus and the print job includes the printing of a plurality of copies, page data is generated a plurality of times during the single job. Here, if document data is constituted by an odd number of pages and double-sided printing is to be performed in the print job of the PWG Raster format, the host side inputting the print job inserts a blank page at the last page of each copy. Accordingly, a situation is prevented in which the last page of the first copy and the top page of the second copy are printed on both sides of the same sheet.

However, the insertion of blank pages for imposition control by the host side is not desirable, because fees would also be charged for the printing of blank pages in charging-type multi function peripherals (MFPs), etc., that collect fees in accordance with the number of pages printed. Furthermore, in IPP, it is known that information based on which breaks between copies are determined (an IPP attribute indicating the number of pages per copy: job-pages-per-set (PWG5100.1 (https://ftp.pwg.org/pub/pwg/candidates/cs-ippfinishings20-20141219-5100.1.pdf))) is set in the job attributes of a print job.

There also is a technique in which a print job is divided into blocks in units of documents, and, if the last page of a block falls on a front side, blank data is inserted at the rear side (Japanese Patent Laid-open No. H10-143342).

In order to exclude the printing of blank pages attributable to double-sided printing from the charging target in a case in which double-sided printing of the Raster format is performed, one measure that can be considered is to treat blank pages for double-sided printing control as non-charging target pages by inserting the blank pages on the printer side. In doing so, one measure that can be considered is to, on the printer side, determine the position of breaks between copies from the above-described attribute information indicating the breaks between copies, and to insert blank pages for imposition control and treat the blank pages as non-charging target pages in the case of double-sided printing in which the number of pages per copy is an odd number of pages. However, in the case of double-sided printing in which the number of pages per copy is an odd number of pages, merely inserting blank pages at parts corresponding to last pages results in cases in which printed matter differing from the printed result intended by a user is output.

A specific example of this will be described using the schematic diagram in FIG. 7.

FIG. 7 is a diagram for describing a conventional technology.

The print job in FIG. 7 is characterized as follows: five pages (pages P1 to P5) are to be printed; double-sided printing is to be performed; face-up discharge is to be performed; and a sheet size differing from that for pages P2 to P5 is set to only page P1 as an exceptional page (IPP attribute: overrides). In this print job, a blank page is inserted at the top because the number of pages per copy is 5 and thus is an odd number of pages, and also because face-up discharge is performed. However, because pages P2 and P1 have mutually differing sizes, blank pages also need to be inserted between pages P2 and P1. In such a manner, printed matter that is not intended by a user may be output if insertion positions of blank pages are determined simply based on the attribute information indicating the number of pages per copy.

SUMMARY OF THE INVENTION

An aspect of the present invention is to eliminate the above-mentioned problem with conventional technology.

A feature of the present invention is to provide a technique enabling a printing apparatus to insert a blank page for double-sided printing even if printing information changes in the middle of a print job due to an exceptional page.

According to a first aspect of the present invention, there is provided a printing apparatus capable of communicating with one or more information processing apparatuses, and performing printing based on a print job received from one of the information processing apparatuses, the printing apparatus comprising: at least one processor and at least one memory configured to function as: an obtaining unit that obtains, from the information processing apparatus from which the print job is received, information indicating the number of pages per copy of the print job; a first determination unit that determines whether double-sided printing is to be performed for the print job; a second determination unit that determines, based on the information obtained by the obtaining unit, whether the print job is a print job in which the number of pages per copy is an odd number of pages; and a control unit that controls to print by inserting a blank page before a page that is received first in the print job, based on a determination by the second determination unit that, in the print job, the number of pages per copy is an odd number of pages.

According to a second aspect of the present invention, there is provided a printing apparatus capable of communicating with one or more information processing apparatuses and performing printing based on a print job received from one of the information processing apparatuses, the printing apparatus comprising: at least one processor and at least one memory configured to function as: an obtaining unit that obtains, from the information processing apparatus from which the print job is received, information indicating the number of pages per copy of the print job; a first determination unit that determines whether double-sided printing is to be performed for the print job; a second determination unit that determines, based on the information obtained by the obtaining unit, whether the print job is a print job in which the number of pages per copy is an odd number of pages; and a control unit that controls to print an image of the last page included in the print job on one side of a sheet and not to print any image on the other side of the sheet, based on a determination by the second determination unit that the number of pages per copy in the print job is an odd number.

According to a third aspect of the present invention, there is provided a method of controlling a printing apparatus capable of communicating with one or more information processing apparatuses, and the printing apparatus capable of performing printing based on a print job received from one of the information processing apparatuses, the method comprising: obtaining, from the information processing apparatus from which the print job is received, information indicating the number of pages per copy of the print job; determining whether double-sided printing is to be performed for the print job; determining, based on the information, whether the number of pages per copy is an odd number of pages if it is determined that double-sided printing is to be performed for the print job; and performing double-sided printing by adding a blank page before image data that is received first in the print job if it is determined that the number of pages per copy is an odd number of pages.

Further features of the present invention will become apparent from the following description of an exemplary embodiment with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 3 is a functional block diagram for describing the software configuration of the MFP pertaining to the embodiment.

FIG. 5 is a diagram illustrating an example in which a 5-page document is printed in double-sided printing and is output face-down.

FIG. 6 is a diagram illustrating an example in which a 5-page document is printed in double-sided printing and is output face-up.

FIG. 7 is a diagram for describing a conventional technology.

FIG. 8 is a diagram illustrating an example in which a document that includes a total of 5 pages, including a page (P1) with a different size, is printed in double-sided printing and is output face-up.

FIG. 9 is a diagram illustrating one example of attributes of a print job transmitted from an information processing apparatus to the MFP.

FIG. 11 is a diagram illustrating an example in which a total of 5 pages including only one page with a different size are printed in double-sided printing and are output face-up by the MFP pertaining to the embodiment.

FIG. 12 is a diagram illustrating an example in which a total of 5 pages including only one page with a different size are printed in double-sided printing and are output face-down by the MFP 101 pertaining to the embodiment.

DESCRIPTION OF THE EMBODIMENT

Figure 1:
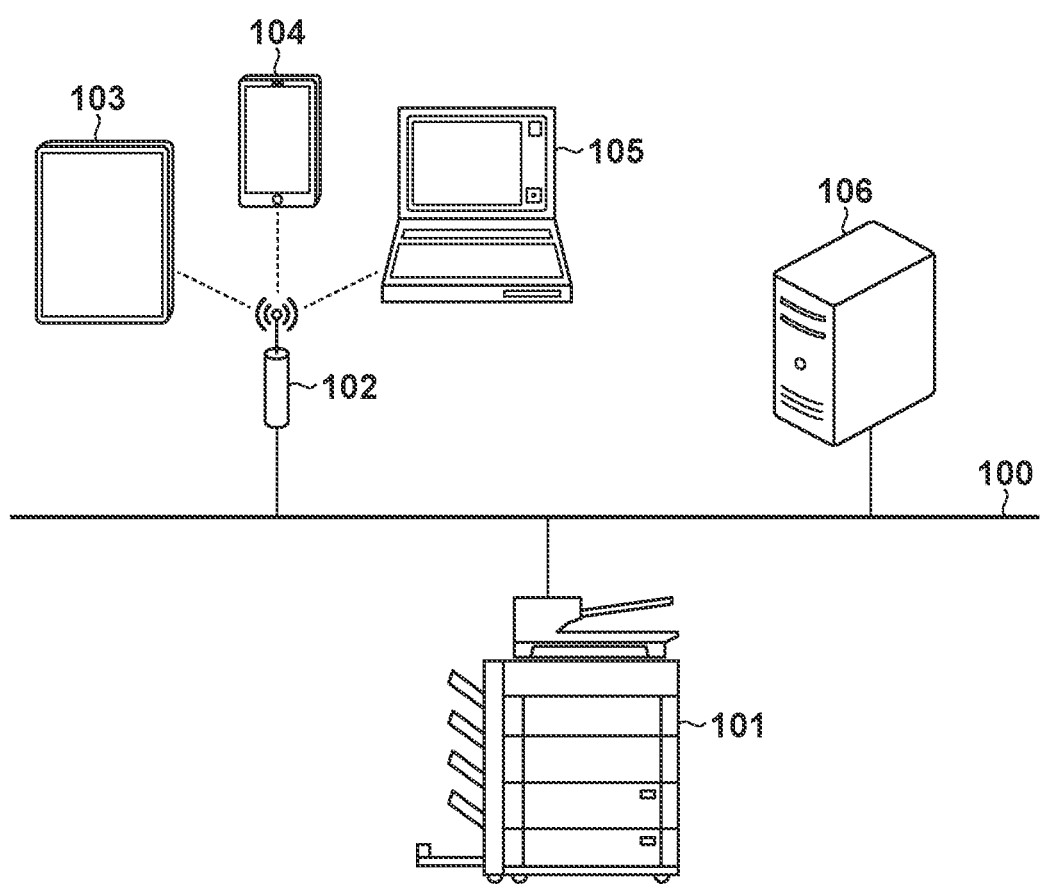
FIG. 1 is a diagram for describing the configuration of a printing system pertaining to an embodiment of the present invention.

An embodiment of the present invention will be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention. Furthermore, multiple features may be combined with one another as desired. Also, same or similar configurations are provided with the same reference numerals in the attached drawings, and overlapping description is omitted. Each of the embodiments of the present invention described below can be implemented solely or as a combination of a plurality of the embodiments or features thereof where necessary or where the combination of elements or features from individual embodiments in a single embodiment is beneficial.

FIG. 1 is a diagram for describing the configuration of a printing system pertaining to an embodiment of the present invention.

On a local area network (LAN) 100, a printing apparatus 101 and an access point (AP) 102 are connected so as to be capable of communicating with one another. In the embodiment, portable terminals 103, 104, and 105, which are a tablet, a smartphone, a PC, etc., are described as examples of information processing apparatuses. Note that in the following description, the term "information processing apparatus" is used as a generic name referring to the tablet 103, the smartphone 104, the PC 105, or the like. This information processing apparatus is capable of mutually communicating with the printing apparatus 101 on the LAN 100 via the AP 102. Furthermore, a management server 106 performs management of print settings. The management server 106 performs management of information relating to print functions that can be set by users of the information processing apparatuses when the printing apparatus 101 processes print jobs. The printing apparatus 101 performs print processing upon receiving a print job from an information processing apparatus.

The printing apparatus 101 has a print function of printing images on sheets (recording media), and is capable of executing print processing based on print data received via the network 100. The embodiment will be described using the above-described example configuration as one example of the printing system. However, the present invention is not limited to this, and it suffices for at least one or more information processing apparatuses and a printing apparatus to be connected so as to be capable of communicating with one another via a network. Furthermore, the network may be a wireless network or a wired network.

Figure 2:
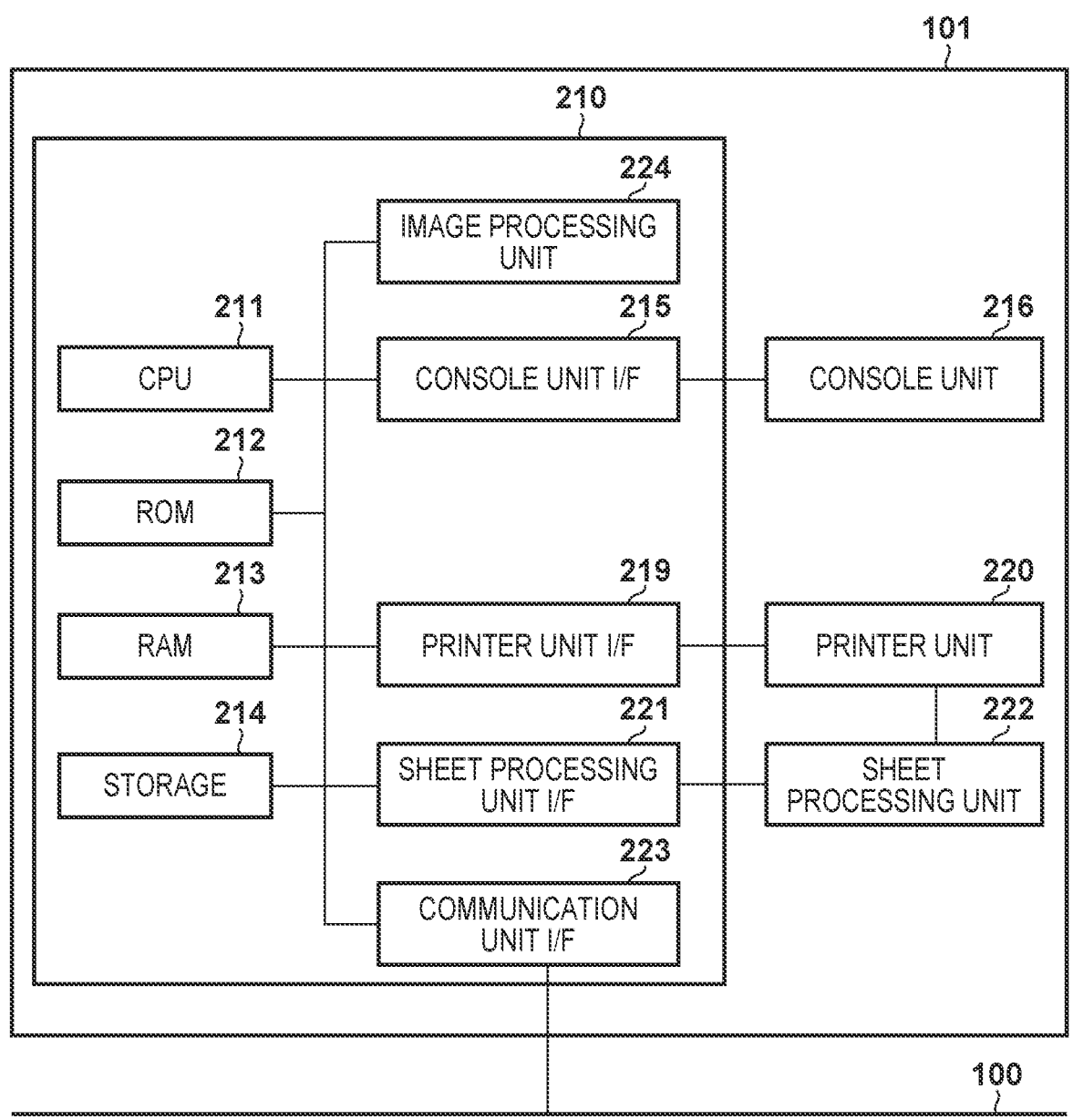
FIG. 2 is a block diagram for describing the hardware configuration of a printing apparatus (MFP) pertaining to the embodiment.

FIG. 2 is a block diagram for describing the hardware configuration of the printing apparatus (MFP) 101 pertaining to the embodiment. This printing apparatus 101 has the print function of printing images on sheets. In the embodiment, the printing apparatus is described as being a printing apparatus such as a MFP, which is a printing apparatus including a scanner and a FAX function.

A control unit 210 including a central processing unit (CPU) 211 controls the operation of the entire MFP 101. The CPU 211 deploys one or more programs stored to a read only memory (ROM) 212 or a storage 214 in a random access memory (RAM) 213, and executes the deployed programs to perform various types of control such as print control. The ROM 212 stores control programs, a boot program, etc., that can be executed by the CPU 211. The RAM 213 is the main storage memory of the CPU 211, and is used as a work area or as a temporary storage area for deploying various control programs. The storage 214 stores print data, image data, various programs, and information of various settings. In the embodiment, the storage 214 is assumed as being an auxiliary storage apparatus such as a hard disk drive (HDD), but a non-volatile memory such as a solid state drive (SSD) may also be used as the storage 214.

Note that, while one CPU 211 executes the different types of processing illustrated in the later-described flowchart using one memory (RAM 213) in the printing apparatus (MFP) 101 pertaining to the embodiment, other forms may also be adopted. For example, a plurality of CPUs, RAMs, ROMs, and storages may be made to operate in cooperation. Furthermore, a configuration may be adopted such that some processing is executed using a hardware circuit such as an application specific integrated circuit (ASIC) or a field-programmable gate array (FPGA).

A console unit interface (I/F) 215 connects a console unit 216 and the control unit 210. The console unit 216 includes a display having a touch-panel function, various hard keys, etc., and functions as a UI (user interface) unit that displays information and accepts user instructions. A printer unit I/F 219 connects a printer unit 220 and the control unit 210. Image data generated by analyzing a print job received from an information processing apparatus is transferred from the control unit 210 to the printer unit 220 via the print unit I/F 219. The printer unit 220 receives a control command and a print job to be printed via the control unit 210, and based on the print job, prints images on sheets fed from a paper feeding cassette (unillustrated). The printer unit 220 is capable of executing one or both of face-up discharge and face-down discharge, depending upon the positions of the sheet transport path and a fixing unit, and whether or not there is a sheet inversion mechanism. Note that the printing method of the printer unit 220 may be an electrophotographic method or an inkjet method. Furthermore, other printing methods such as a thermal transfer method are also applicable. The control unit 210 is also connected to the LAN 100 via a communication unit I/F 223. The communication unit I/F 223 transmits image data and information to the information processing apparatuses on the LAN 100 and receives print jobs and information from the information processing apparatuses on the LAN 100.

An image processing unit 224 has the function of a raster image processor (RIP) that rasterizes print jobs received via the LAN 100 and generates image data to be used for printing. Furthermore, the image processing unit 224 is capable of performing resolution conversion and correction processing on image data obtained by rasterizing print jobs. Note that, while it is assumed in the embodiment that the image processing unit 224 is realized using a hardware circuit (an ASIC or FPGA), there is no limitation to this. For example, the MFP 101 may further include a processor for image processing, and the processor may realize image processing and processing for rasterization into print data by executing an image processing program. In this case, the processor and the CPU 211 cooperate with one another to realize the processing. Furthermore, a configuration can also be adopted such that the CPU 211 executes a program for performing image processing, and performs image processing and processing for rasterization into print data. Also, a configuration may be adopted such that image processing is performed by a combination of any of the above.

A sheet processing unit I/F 221 connects the control unit 210 and a sheet processing unit 222. The sheet processing unit 222 receives a control command from the control unit 210, and, in accordance with the control command, performs post processing such as stapling, folding, and/or bookbinding, for example, on sheets printed by the printer unit 220. This post processing is executed one copy at a time. Note that, if a print job received includes information indicating the number of pages per copy, the post processing is executed in units of the number of pages of the information.

FIG. 3 is a functional block diagram for describing the software configuration of the printing apparatus (MFP) 101 pertaining to the embodiment. Note that the functional blocks illustrated in FIG. 3 are achieved in the embodiment by the CPU 211 executing programs deployed in the RAM 213.

An IPP print service control module 315 notifies an information processing apparatus of capability information of the printer unit 220. The capability information is obtained from an engine control module 314. This capability information includes detailed specifications displayed on a normal print settings screen, such as available sheet sizes and sheet types, the availability of one-sided/double-sided printing, and available finishing settings such as stapling and punching. Attribute information in the present embodiment includes the capability information.

Accordingly, the information processing apparatus generates a print setting screen based on the capability information received from the MFP 101. Furthermore, a user sets print settings via the print setting screen created based on the capability information, and presses a print button on the print setting screen. Here, the information processing apparatus controls the print setting screen based on the capability information notified from the MFP 101. If the print button is pressed, the information processing apparatus generates attribute information as job attributes, and requests the MFP 101 to verify the settings created by the user (Validate Job Request)

Upon receiving this verification request, the IPP print service control module 315 passes on temporary print setting information to a job settings storing/verifying module 303. The job settings storing/verifying module 303 compares the job attributes set by the information processing apparatus and the print functions of the MFP 101, and if printing with the job attributes that are set can be performed, provides an affirmative notification to that effect to the information processing apparatus via the IPP print service control module 315. On the other hand, if the print setting information includes print settings that do not confirm to the capability information of the MFP 101, the job settings storing/verifying module 303 determines that processing cannot be performed, provides a negative notification to that effect to the information processing apparatus, and requests that items in the print settings be reconsidered.

Upon receiving a print job from the information processing apparatus, the IPP print service control module 315 passes on the print job to a print job generation module 302. Furthermore, the IPP print service control module 315 also passes on settings information of the print job to the job settings storing/verifying module 303.

A user interface (UI) control module 301 obtains information regarding the state of a print job being processed from a job control module 307, and displays the processing status of the print job on a UI screen. The print job generation module 302 receives a print job from the information processing apparatus via the IPP print service control module 315, and writes the print job to a data reception control module 305, and also registers the print job as a new job to the job control module 307 and requests that print processing be started. Furthermore, the print job generation module 302 passes on print settings information to be applied to a print job to a job attribute storing module 308 via the job settings storing/verifying module 303.

The data reception control module 305 is a buffer area for print jobs received by the print job generation module 302, and temporarily stores the print jobs individually to the storage 214. If the job control module 307 instructs a PDL analyzing module 306 to perform PDL analysis processing of a print job, the PDL analyzing module 306 requests the data reception control module 305 to provide the print job. Accordingly, the data reception control module 305 passes on data of the print job to the PDL analyzing module 306. Furthermore, the job control module 307 instructs the PDL analyzing module 306 to analyze the print job. In connection with page data that the PDL analyzing module 306 generates, a page control module 309 stores image data to a page storing module 310 and stores page attribute information to a page attribute storing module 311.

The job attribute storing module 308 stores attribute information of print jobs. This attribute information is set as IPP job attributes and document attributes, such as "number of copies," "print side (one-sided/double-sided) settings," and "finishing settings." The page control module 309 controls page analysis processing performed by the PDL analyzing module 306, raster image processing (RIP) performed by an RIP control module 313, and print control processing performed by a print control module 312. The print control module 312 obtains image data already subjected to RIP from the page storing module 310, and performs transferring to the engine control module 314 after subjecting the image data to color separation into the colors C, M, Y, and K. For each page, the engine control module 314 receives image data of each of the colors C, M, Y, and K from the print control module 312, and controls the printer unit 220 and performs print processing of each page.

Here, upon analysis of received job attributes by the PDL analyzing module 306, an IPP attribute indicating the number of pages per copy (job-pages-per-set) and an IPP attribute indicating exceptional pages (overrides) are analyzed and stored to the job attribute storing module 308. The page control module 309 performs control of pages, such as the insertion of blank pages for double-sided printing, based on the job attributes stored in the job attribute storing module 308 and page attributes stored in the page attribute storing module 311.

Figure 4:
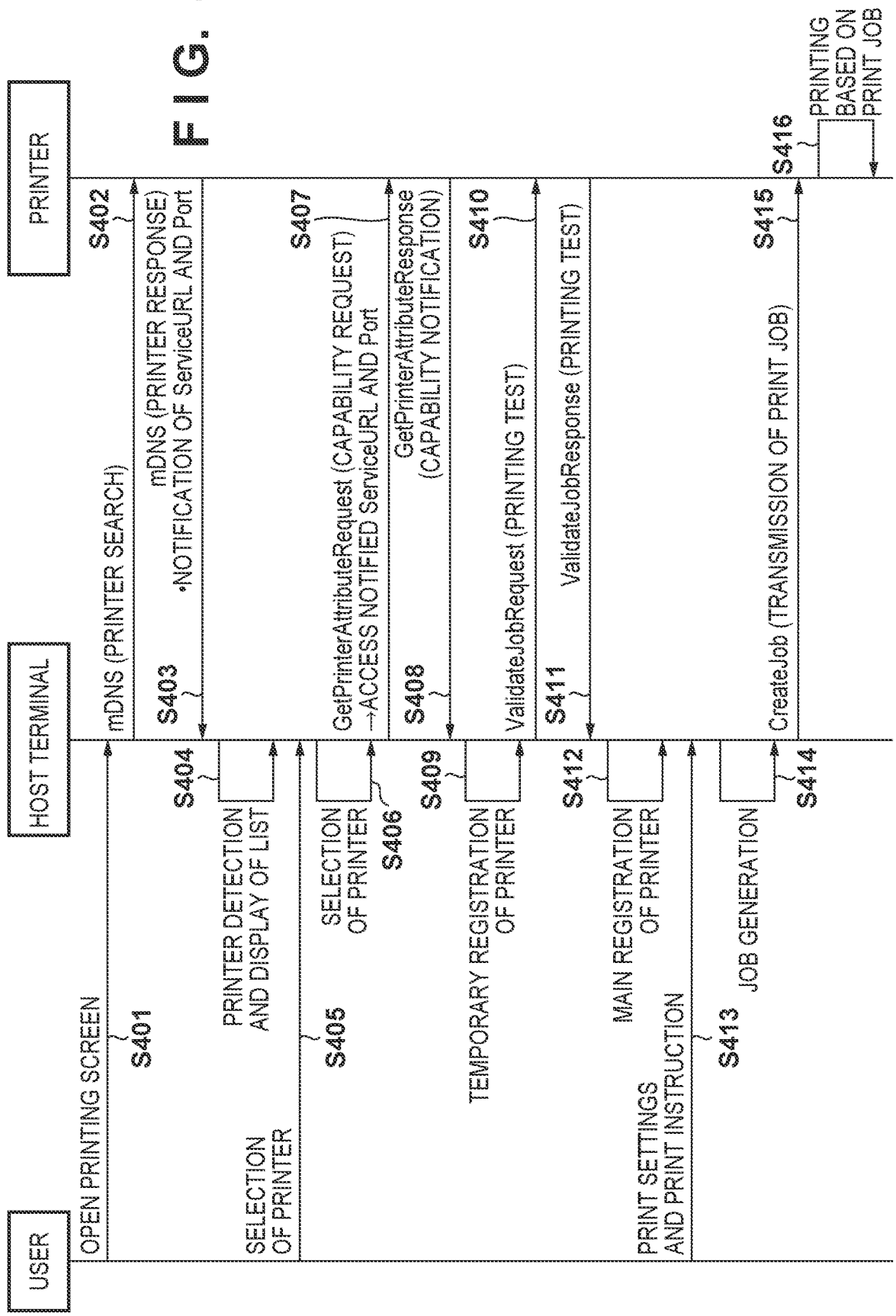
FIG. 4 is a diagram for describing a basic printing sequence in a typical printing system.

FIG. 4 is a diagram for describing a basic printing sequence in a typical printing system.

Upon detection of a user operation of opening a printing screen, a host terminal, which is an information processing apparatus or the like, displays an unillustrated printing screen in S401. Next, in S402, the host terminal broadcasts a printer search request on a network. Here, it is regarded that a device search using mDNS is performed, for example. Next, in S403, printers (printing apparatuses, etc.) having received the search request transmit responses to the search request to the host terminal. Accordingly, upon receiving responses to the search request, the host terminal displays printer detection results in the form of a list on a console unit of the host terminal in S404. Then, the user selects a printer via the console unit in S405. Accordingly, the host terminal receives the selection of a printer by the user in S406, and transmits an inquiry for printing capability information to the selected printer in S407. Upon receiving the inquiry for printing capability information, the printer transmits the printing capability information of the printer itself as a response in S408.

Upon receiving the response with the printing capability information, the host terminal performs temporary registration of the printer in S409 and subjects the printer to a printing test in S410. Accordingly, the printer responds to the printing test in S411. Then, upon receiving the response to the printing test, the host terminal performs main registration of the printer in S412.

Subsequently, if the user sets print settings and issues a print instruction from the console unit in S413, the host terminal, having received the print instruction, generates a print job in S414. Then, the host terminal transmits the generated print job to the registered printer in S415.

Here, the format and order in which print data is transmitted vary depending upon the printing capability information of the printer. For example, if a PDF file is to be printed and the reception capability of the printer is greater than the size of the PDF file, the PDF file is transmitted as-is. On the other hand, if the size of the PDF file is greater than the reception capability of the printer, the host converts the PDF file into PWG Raster Format data in units of single pages. Then, the host transmits the image data in the PWG Raster Format one page at a time in the order in which the pages are printed by the printer. Then, in S416, the printer performs printing based on the received print job.

Next, a specific example of blank page insertion to be executed by a printer in face-down printing will be described with reference to FIG. 5.

FIG. 5 is a diagram illustrating an example in which a 5-page document is printed in double-sided printing and is output face-down.

In face-down printing, a sheet is discharged with the printed side facing downward (with the printed side on the lower side) in the case of one-sided printing. On the other hand, in regular double-sided printing, a sheet is discharged after the first side is printed on the sheet, the sheet is reversed in a double-side path, and the second side is printed on the sheet. As a result of this, in double-sided printing, a sheet is discharged with the printed first side on the upper side of the sheet and the printed second side on the lower side of the sheet. In double-sided printing, in order to discharge a sheet with the side of the sheet on which a first page (i.e., the page that is to become the front page of the printed matter) is printed on the lower side in a similar manner as in the case of one-sided printing, pages are allocated in sets of two pages each to single pieces of sheets, and printing is performed so that the earlier page will be on the second side (lower side). For example, upon double-sided printing of pages P1 and P2 on a same sheet, after page P2 is printed on the front side of the sheet, the sheet is reversed and page P1 is printed on the rear side of the sheet, and the sheet is discharged with the rear side facing downward (with the rear side on the lower side).

Furthermore, if the received pages of the print job are processed in order and it becomes clear that page P6 does not exist after page P5 is received, the printer inserts a blank page 501 at the rear side of page P5. Due to this blank page 501 being inserted by the printer, the blank page can be treated as a non-charging target page. That is, the blank page 501 is not counted as a charging target page.

On the other hand, in the case of face-up discharge, a blank page needs to be inserted at a different position. A specific position at which a blank page is inserted will be described using FIG. 6.

FIG. 6 is a diagram illustrating an example in which a 5-page document is printed in double-sided printing and is output face-up.

In face-up discharge, a sheet is discharged with the printed side on the upper side in the case of one-sided printing. On the other hand, in regular double-sided printing, after the first side is printed on a sheet, the sheet is reversed in a double-side path and the second side is printed before the sheet is discharged. As a result of this, in double-sided printing, a sheet is discharged with the first side on the lower side and the second side on the upper side. In double-sided printing with face-up discharge, in order to discharge a sheet with the side of the sheet on which a first page (i.e., the page that is to become the front page of the printed matter) is printed on the upper side in a similar manner as in the case of one-sided printing, the host side inputs the print data in reverse order. That is, print data is input starting from the last page of each copy, and the printer performs printing in the order in which pages are received. Here, the printer inserts a blank page 601 at the lower side of the first sheet if the number of pages per copy (job-pages-per-set) of the received job is an odd number of pages. In such a manner, no blank pages following this are required if the remaining pages are printed in order. Furthermore, similarly to the blank page insertion in face-down printing, the blank page can be treated as a non-charging target page because the blank page is inserted in the printer.

In the embodiment, cases in which different sheet sizes, etc., are mixed are considered in addition to the above-described cases.

As already described above with reference to FIG. 7, it would suffice to just insert a blank page corresponding to page P1 if a blank page were not inserted at the top page. However, in FIG. 7, a total of three blank pages need to be inserted as a result of having inserted a blank page at the top page. FIG. 8 illustrates a diagram in which a blank page is inserted by the host, in view of such a problem illustrated in FIG. 7.

FIG. 8 is a diagram illustrating an example in which a document that includes a total of 5 pages, including a page (P1) with a different size, is printed in double-sided printing and is output face-up.

Due to a blank page corresponding to the rear side of a page (P1) being inserted by the host, there is no need for the printer to insert blank pages. Due to this, the total number of blank pages is limited to one. However, due to this blank page being inserted by the host, the printer cannot determine whether this page is blank or not. Due to this, the printer cannot treat this blank page as a non-charging target page, and thus, counts the blank page as a charging target page.

A specific control method for realizing the blank sheet insertion described in FIGS. 5-6, and 8 will be described with reference to FIGS. 9 to 12.

FIG. 9 is a diagram illustrating one example of attributes of a print job transmitted from an information processing apparatus to the MFP 101.

In this example of print job attributes, reference numeral 901 denotes that three copies are to be printed, and reference numeral 902 denotes double-sided printing. Furthermore, reference numeral 905 denotes that the number of pages per copy is 7 pages, and reference numeral 903 denotes that the sheet size is the letter size. Also, the legal size is designated for the first page using the exceptional page attributes indicated by reference numeral 906. Furthermore, reference numeral 904 denotes that the print data will be input in reverse order.

Figure 10:
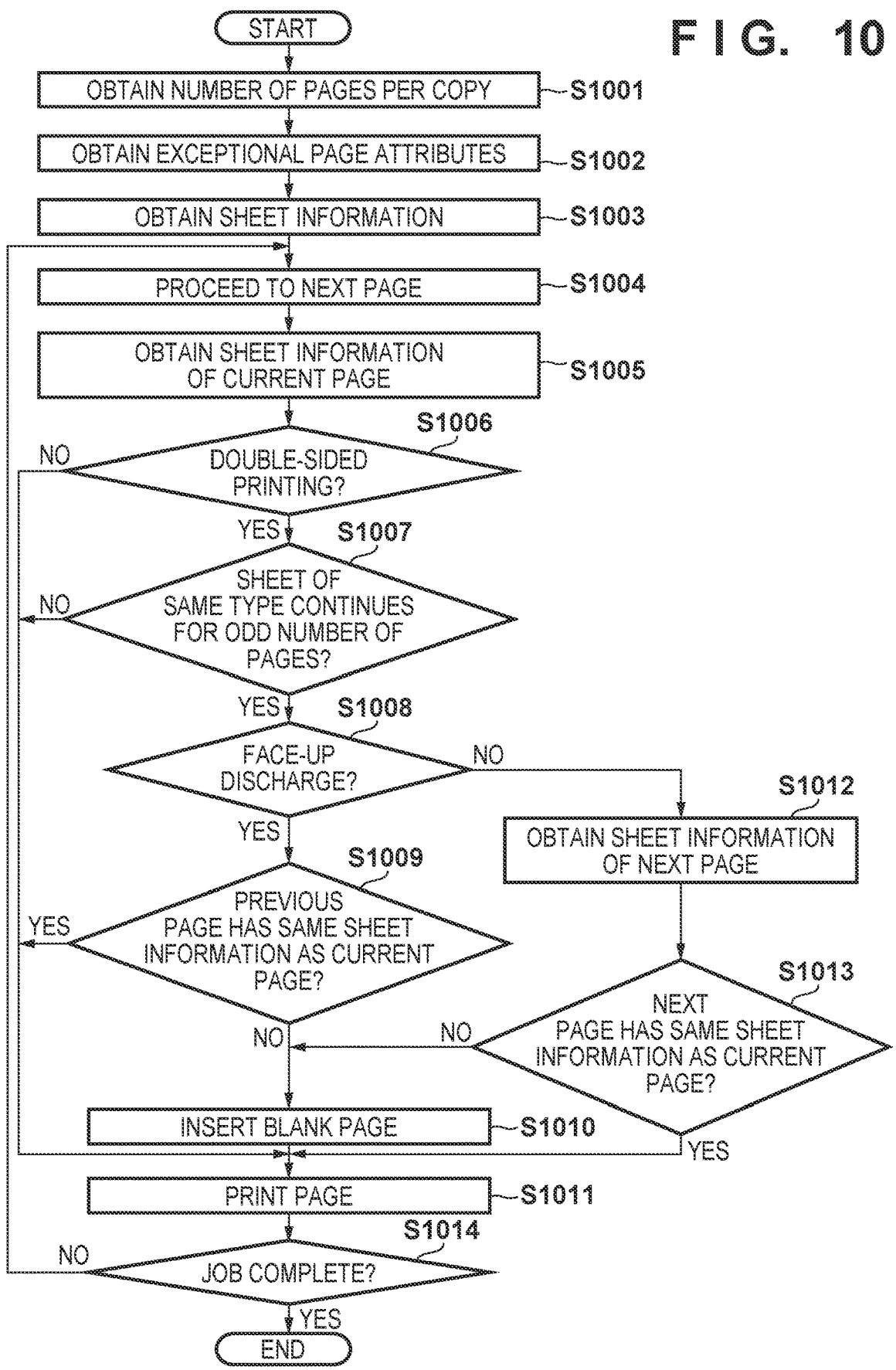
FIG. 10 is a flowchart for describing processing by the MFP pertaining to the embodiment.

FIG. 10 is a flowchart for describing processing by the MFP 101 pertaining to the embodiment. Note that the operations (steps) described in this flowchart are realized by the CPU 211 deploying in the RAM 213 programs for realizing the respective modules, which are stored in the ROM 212 or storage 214, and executing the programs. Furthermore, some processing is realized by the modules realized by the CPU 211 and components such as the image processing unit 224 and the communication unit I/F 223 cooperating with one another. Also, the flowchart illustrated in FIG. 10 indicates a sequence of control executed as a result of an IPP print job being received from a printer client such as the information processing apparatus 103, 104, or 105.

First, from the job attributes illustrated in FIG. 9, the CPU 211 obtains the number of pages per copy in step S1001, and obtains the exceptional page attributes in step S1002. Furthermore, the CPU 211 obtains sheet information in step S1003.

Then, the processing proceeds to step S1004 and the CPU 211 proceeds to processing of data of the next page. In the first iteration, the CPU 211 sets the first page as the print-target page and proceeds with processing. In the second and subsequent iterations, the CPU 211 newly sets the page subsequent to the print-target page as the current page and proceeds with processing. Then, the processing proceeds to step S1005 and the CPU 211 obtains the sheet information of the print-target page. The sheet information includes the sheet size, the sheet type, and the availability of double-sided printing. This sheet information is based on the sheet information obtained in step S1003 and is updated with the sheet information included in the exceptional page attributes if the page is within the range included in the exceptional page attributes obtained in step S1002.

Next, the processing proceeds to step S1006 and the CPU 211 determines whether double-sided printing of the print-target page is to be performed. The processing proceeds to step S1007 if double-sided printing is to be performed, and otherwise the processing proceeds to step S1011. In step S1007, the CPU 211 determines whether or not pages to be printed on the same type of sheet as the print-target page continue for an odd number of pages. The processing proceeds to step S1008 if such pages continue for an odd number of pages, and the processing proceeds to step S1011 if such pages continue for an even number of pages. This is because, if such pages continue for an odd number of pages, a blank page for double-sided printing needs to be inserted somewhere among the consecutive pages to be printed on the same type of sheet, while double-sided printing can be performed without inserting any blank pages if such pages continue for an even number of pages. The attributes obtained in steps S1001 to S1003 are used in order to determine whether or not the same type of sheets continue.

In step S1008, the CPU 211 determines whether or not face-up discharge (or output) is to be performed, and the processing proceeds to step S1009 if face-up discharge (or output) is to be performed, and the processing proceeds to step S1012 if face-down discharge (or output) is to be performed. Processing is switched in such a manner because the blank page insertion position changes depending upon whether face-up discharge is performed or face-down discharge is performed, as already described with reference to FIGS. 5 and 6. Specifically, the CPU 211 determines whether or not the previous page has the same sheet information as the current page in step S1009, and the processing proceeds to step S1011 if the sheet information is the same and otherwise the processing proceeds to step S1010. Note that for the first page, it is determined that the sheet information differs from that of the previous page because there is no page before the first page. The CPU 211 inserts a blank page in step S1010, and the processing proceeds to step S1011. The blank page insertion here is the insertion of a page in the MFP 101, and thus, the blank page can be treated as a non-charging target page and the print count of charging target pages is not incremented. The CPU 211 prints the current page in step S1011, and the processing proceeds to step S1014.

Step S1012 corresponds to the case in which face-down discharge or output is to be performed, and the CPU 211 obtains sheet information of the next page. Then, the processing proceeds to step S1013 and the CPU 211 determines whether or not the next page and the current print-target page have the same sheet information. The processing proceeds to step S1011 if the sheet information is the same. Otherwise, the processing proceeds to step S1010 and the CPU 211 inserts a blank page, and the processing proceeds to step S1011 and the CPU 211 prints the page. The CPU 211 determines whether or not the job is over in step S1014. The CPU 211 terminates this processing if printing has been completed up to the last page, and the processing proceeds to step S1004 if there are any remaining pages.

FIGS. 11 and 12 each indicate one example of processing results yielded by the MFP 101 executing the processing illustrated in FIG. 10 in such a manner.

FIG. 11 is a diagram illustrating an example in which a total of 5 pages including only one page with a different size are printed in double-sided printing and are output face-up by the MFP 101 pertaining to the embodiment. In this case, the pages included in the print job are arranged in reverse order.

FIG. 12 is a diagram illustrating an example in which a total of 5 pages including only one page with a different size are printed in double-sided printing and are output face-down by the MFP 101 pertaining to the embodiment. In this case, the pages included in the print job are arranged in normal order.

The MFP 101 does not insert any blank pages while processing pages P2 to P5, because the same sheet information continues for an even number of pages. On the other hand, when page P1 is processed, the same sheet information continues only for one page, which is page P1, or that is, the same sheet information continues only for an odd number of pages. Here, in the case of face-up discharge, a blank page is inserted as illustrated in FIG. 11 because page P1 and the previous page P2 have difference sheet sizes. Furthermore, also in the case of face-down discharge, a blank page is inserted as illustrated in FIG. 12 because page P1 and the next page P2 have different sheet sizes.

According to the present embodiment, a blank page can be inserted by the printing apparatus side even in a print job in which sheet information changes in the middle of the print job due to exceptional page attributes, as described above. Due to this, the printing apparatus is able to treat the blank page as a non-charging target page in a case that the printing apparatus collects fees in accordance with the number of pages printed.

Furthermore, the embodiment has the effect of enabling the output of printed matter intended by users while performing charging processing appropriate for the users, also in print processing using IPP.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-044192, filed Mar. 11, 2019, which is hereby incorporated by reference herein in its entirety.

What is claimed is:

1. A printing apparatus capable of communicating with one or more information processing apparatuses, and performing printing based on a print job received from one of the information processing apparatuses, the printing apparatus comprising:
    at least one processor and at least one memory configured to function as:
    an obtaining unit that obtains, from the information processing apparatus from which the print job is received, information indicating the number of pages per copy in the print job;
    a first determination unit that determines whether double-sided printing is to be performed for the print job;
    a second determination unit that determines, based on the information obtained by the obtaining unit, whether the print job is a print job in which the number of pages per copy is an odd number of pages; and
    a control unit that controls to print by inserting a blank page in the print job based on a determination by the second determination unit that, in the print job, the number of pages per copy is an odd number of pages,
    wherein an image of a page that is received first in the print job is printed at a back side of the inserted blank page.

2. The printing apparatus according to claim 1, wherein the at least one processor and the at least one memory configured to further function as:
    a reception unit that receives the print job,
    wherein following the blank page, the control unit controls to print in the order in which pages are received by the reception unit.

3. The printing apparatus according to claim 1, wherein the printing apparatus performs face-up discharge.

4. The printing apparatus according to claim 1, wherein the printing apparatus does not charge any fees for blank image data.

5. The printing apparatus according to claim 2, wherein the reception unit receives image data included in the print job in order from the last page.

6. The printing apparatus according to claim 1, wherein the printing apparatus, after printing an image on one side of a sheet, reverses the sheet and prints an image on the other side of the sheet.

7. The printing apparatus according to claim 1, wherein the at least one processor and the at least one memory configured to further function as:
a post processing unit that executes post processing on sheets on which images have been printed, based on the information indicating the number of pages per copy.

8. A printing apparatus capable of communicating with one or more information processing apparatuses and performing printing based on a print job received from one of the information processing apparatuses, the printing apparatus comprising:
at least one processor and at least one memory configured to function as:
an obtaining unit that obtains, from the information processing apparatus from which the print job is received, information indicating the number of pages per copy in the print job;
a first determination unit that determines whether double-sided printing is to be performed for the print job;
a second determination unit that determines, based on the information obtained by the obtaining unit, whether the print job is a print job in which the number of pages per copy is an odd number of pages; and
a control unit that controls to print an image of the last page included in the print job on one side of a sheet and not to print any image on the other side of the sheet based on a determination by the second determination unit that the number of pages per copy in the print job is an odd number.

9. The printing apparatus according to claim 8, wherein the at least one processor and the at least one memory configured to further function as:
a reception unit that receives the print job,
wherein the reception unit receives image data in order from image data of the last page in the print job.

10. The printing apparatus according to claim 9, wherein the control unit controls to print images in the order in which pages are received by the reception unit.

11. The printing apparatus according to claim 8, wherein the printing apparatus performs charging of fees based on the number of pages of image data included in the print job.

12. The printing apparatus according to claim 8, wherein the printing apparatus, after printing an image on one side of a sheet, reverses the sheet and prints an image on the other side of the sheet.

13. The printing apparatus according to claim 8, wherein the printing apparatus performs face-up discharge.

14. The printing apparatus according to claim 8, wherein the at least one processor and the at least one memory configured to further function as:
a post processing unit that executes post processing on sheets on which images have been printed, based on the information indicating the number of pages per copy.

15. A method of controlling a printing apparatus capable of communicating with one or more information processing apparatuses, and the printing apparatus capable of performing printing based on a print job received from one of the information processing apparatuses, the method comprising:
obtaining, from the information processing apparatus from which the print job is received, information indicating the number of pages per copy in the print job;
determining whether double-sided printing is to be performed for the print job;
determining, based on the information, whether the number of pages per copy is an odd number of pages if it is determined that double-sided printing is to be performed for the print job; and
performing double-sided printing by inserting a blank page if it is determined that the number of pages per copy is an odd number of pages,
wherein an image of a page that is received first in the print job is printed at a back side of the inserted blank page.

16. The method according to claim 15, wherein pages included in the print job are arranged in reverse order in the print job.

17. A non-transitory computer-readable storage medium storing a program for causing a processor to execute a method of controlling a printing apparatus capable of communicating with one or more information processing apparatuses, and the printing apparatus capable of performing printing based on a print job received from one of the information processing apparatuses, the method comprising:
obtaining, from the information processing apparatus from which the print job is received, information indicating the number of pages per copy in the print job;
determining whether double-sided printing is to be performed for the print job;
determining, based on the information, whether the number of pages per copy is an odd number of pages if it is determined that double-sided printing is to be performed for the print job; and
performing double-sided printing by inserting a blank page if it is determined that the number of pages per copy is an odd number of pages,
wherein an image of a page that is received first in the print job is printed at a back side of the inserted blank page.

* * * * *